United States Patent
Lee et al.

(10) Patent No.: US 11,669,734 B2
(45) Date of Patent: Jun. 6, 2023

(54) TRAINING METHOD OF NEURAL NETWORK AND CLASSIFICATION METHOD BASED ON NEURAL NETWORK AND DEVICE THEREOF

(71) Applicant: Coretronic Corporation, Hsin-Chu (TW)

(72) Inventors: Cheng-Hsin Lee, Hsin-Chu (TW); Huai-En Wu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 102 days.

(21) Appl. No.: 16/748,817

(22) Filed: Jan. 22, 2020

(65) Prior Publication Data
US 2020/0242415 A1    Jul. 30, 2020

(30) Foreign Application Priority Data
Jan. 30, 2019 (CN) .......................... 201910091607.8

(51) Int. Cl.
*G06N 3/08* (2023.01)
*G06V 10/764* (2022.01)
(Continued)

(52) U.S. Cl.
CPC .......... *G06N 3/08* (2013.01); *G06F 18/2178* (2023.01); *G06F 18/2415* (2023.01);
(Continued)

(58) Field of Classification Search
CPC .. G06K 9/6263; G06K 9/6254; G06K 9/6277; G06K 9/6256; G06K 9/627; G06N 3/08
See application file for complete search history.

(56) References Cited

U.S. PATENT DOCUMENTS 10,467,503 B1 * 11/2019 Kim ..................... G06V 10/772
2015/0242707 A1 * 8/2015 Wilf ..................... G06V 40/168
382/159
(Continued)

FOREIGN PATENT DOCUMENTS

CN         101253493        8/2008
CN         105849747        8/2016
(Continued)

OTHER PUBLICATIONS

Sergey Zagoruyko, et al., "Learning to Compare Image Patches via Convolutional Neural Networks", 2015 IEEE Conference on Computer Vision and Pattern Recognition (CVPR), Jun. 7-12, 2015, pp. 4353-4361.
(Continued)

*Primary Examiner* — John W Lee
(74) *Attorney, Agent, or Firm* — JCIPRNET (57) ABSTRACT

A supervised training device and method for training a neural network, and a supervised classification method and device based on the neural network are provided. The training device includes a storage unit and a processor. The processor accesses and executes a sampling module, a labelling module and a training module in the storage unit. The sampling module samples a first image and a second image from a first dataset. The labelling module tags the first image in response to a first control instruction to generate a first tagged image, and generates label data according to the first tagged image and the second image. The training module trains the neural network according to the label data.

10 Claims, 5 Drawing Sheets

(51) Int. Cl.
  *G06V 10/774* (2022.01)
  *G06V 10/82* (2022.01)
  *G06F 18/21* (2023.01)
  *G06F 18/40* (2023.01)
  *G06F 18/2415* (2023.01)

(52) U.S. Cl.
  CPC ............ *G06F 18/41* (2023.01); *G06V 10/764* (2022.01); *G06V 10/774* (2022.01); *G06V 10/82* (2022.01)

(56) References Cited

U.S. PATENT DOCUMENTS

| | | | | |
|---|---|---|---|---|
| 2015/0347819 | A1* | 12/2015 | Yin | G06V 40/16 382/118 |
| 2016/0110424 | A1* | 4/2016 | Goeppinger | G06F 16/9535 707/780 |
| 2019/0065817 | A1* | 2/2019 | Mesmakhosroshahi | G06V 10/82 |
| 2020/0125887 | A1* | 4/2020 | Nishii | G06N 3/045 |
| 2020/0160111 | A1* | 5/2020 | Ling | G06T 7/174 |

FOREIGN PATENT DOCUMENTS

| | | |
|---|---|---|
| CN | 106471526 | 3/2017 |
| CN | 106920219 | 7/2017 |
| TW | 201706918 | 2/2017 |
| TW | 201824098 | 7/2018 |
| WO | 2016090044 | 6/2016 |

OTHER PUBLICATIONS

Mei Zhang, et al., "The Application of One-Class Classifier Based on CNN in Image Defect Detection", Procedia Computer Science, Nov. 2017, pp. 341-348.

Young-Jin Cha, et al., "Deep Learning-Based Crack Damage Detection Using Convolutional Neural Networks", Computer-Aided Civil and Infrastructure Engineering, Mar. 2017, pp. 1-18.

Mehdi Mirza, et al., "Conditional Generative Adversarial Nets", arXiv:1411.1784, Nov. 6, 2014, pp. 1-7.

* cited by examiner

TRAINING METHOD OF NEURAL NETWORK AND CLASSIFICATION METHOD BASED ON NEURAL NETWORK AND DEVICE THEREOF

CROSS-REFERENCE TO RELATED APPLICATION

This application claims the priority benefit of China application serial no. 201910091607.8, filed on Jan. 30, 2019. The entirety of the above-mentioned patent application is hereby incorporated by reference herein and made a part of this specification.

BACKGROUND

Technical Field

The invention relates to a neural network technology, and particularly relates to a supervised training method of a supervised neural network and a training device thereof, and a supervised classification method based on the neural network and a classification device thereof.

Description of Related Art

Current neural networks may be generated through supervised learning or unsupervised learning. Generally, to use the neural network generated through the supervised learning to perform object classification may achieve high accuracy or high precision. However, the neural network based on the supervised learning has two disadvantages. First, for those unfamiliar with the art, it is very difficult to adjust parameters of the neural network to make it suitable for different situations. Second, when a type or model of the object to be classified changes, the neural network also needs to be retrained. Therefore, a user of the neural network based on the supervised learning often spends a lot of time to adjust parameters and retrain the neural network for different objects. The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention is directed to a supervised training method of a neural network and a training device thereof, and a supervised classification method based on the neural network and a classification device thereof. The neural network trained by the invention is adapted to different types or models of objects without retraining.

Other objects and advantages of the invention may be further illustrated by the technical features broadly embodied and described as follows.

In order to achieve one or a portion of or all of the objects or other objects, the invention provides a supervised training device adapted to train a neural network. The training device includes a storage unit and a processor. The storage unit stores a plurality of modules. The processor is coupled to the storage unit, and accesses and executes the plurality of modules in the storage unit. The modules include a sampling module, a labelling module and a training module. The sampling module samples a first image and a second image from a first dataset. The labelling module tags the first image in response to a first control instruction to generate a first tagged image, and generates label data according to the first tagged image and the second image. The first control instruction is related to a user's selection of the first image and the second image. The training module trains the neural network according to the label data.

In order to achieve one or a portion of or all of the objects or other objects, the invention provides a supervised training method adapted to train a neural network. The training method includes: sampling a first image and a second image from a first dataset; tagging the first image in response to a first control instruction to generate a first tagged image. The first control instruction is related to a user's selection of the first image and the second image; generating label data according to the first tagged image and the second image; and training the neural network according to the label data.

In order to achieve one or a portion of or all of the objects or other objects, the invention provides a supervised classification device based on a neural network, which includes a storage unit and a processor. The storage unit stores a neural network module. The processor is coupled to the storage unit, and accesses and executes the neural network module. The neural network module receives a reference image and a target image, and classifies the target image according to the neural network and the reference image, so as to generate a classification result of the target image.

In order to achieve one or a portion of or all of the objects or other objects, the invention provides a supervised classification method based on a neural network, which includes: receiving a reference image and a target image, and classifying the target image according to the neural network and the reference image, so as to generate a classification result of the target image.

According to the above description, the neural network trained by the invention is adapted to different types or models of objects without retraining. On the other hand, the user may intuitively set classification criteria of the neural network through the reference image.

Other objectives, features and advantages of the present invention will be further understood from the further technological features disclosed by the embodiments of the present invention wherein there are shown and described preferred embodiments of this invention, simply by way of illustration of modes best suited to carry out the invention.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

In order to resolve a problem that a user of a neural network based on a supervised learning often spends a lot of time to adjust parameters of the neural network and retrain the neural network for different objects, the invention provides a training method of a neural network and a training device thereof, and and a classification method based on the neural network and a classification device thereof.

Figure 1:
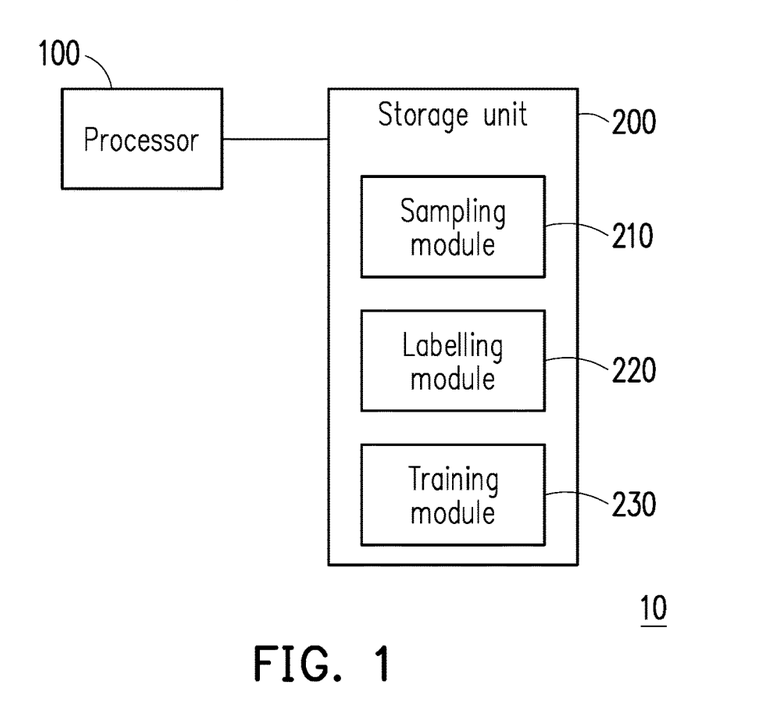
FIG. 1 is a schematic diagram of a training device of a neural network according to an embodiment of the invention.

FIG. 1 is a schematic diagram of a training device 10 of a neural network according to an embodiment of the invention. The neural network is, for example, any neural network based on supervised learning, but the invention is not limited thereto. The training device 10 may include a processor 100 and a storage unit 200.

The processor 100 is, for example, a Central Processing Unit (CPU), or other programmable general purpose or special purpose microprocessor, a Digital Signal Processor (DSP), a programmable controller, an Application Specific Integrated Circuit (ASIC), a Graphics Processing Unit (GPU), or other similar device or a combination of the above devices. The processor 100 is coupled to the storage unit 200, and is adapted to access and execute various modules or various applications stored in the storage unit 200.

The storage unit 200 is, for example, any type of a fixed or movable Random Access Memory (RAM), a Read-Only Memory (ROM), a flash memory, a Hard Disk Drive (HDD), a Solid State Drive (SSD), or a similar device or a combination of the above devices, and is configured to record a plurality of modules or various applications that may be executed by the processor 100. In the embodiment, the storage unit 200 may store a plurality of modules such as a sampling module 210, a labelling module 220 and a training module 230, etc., and functions thereof are to be described later. The sampling module 210, the labelling module 220 and the training module 230 are, for example, programs codes of a program or software, and the processor 100 executes the above modules (execute the program codes) to achieve procedures and effects to be achieved by the modules.

Figure 2A:
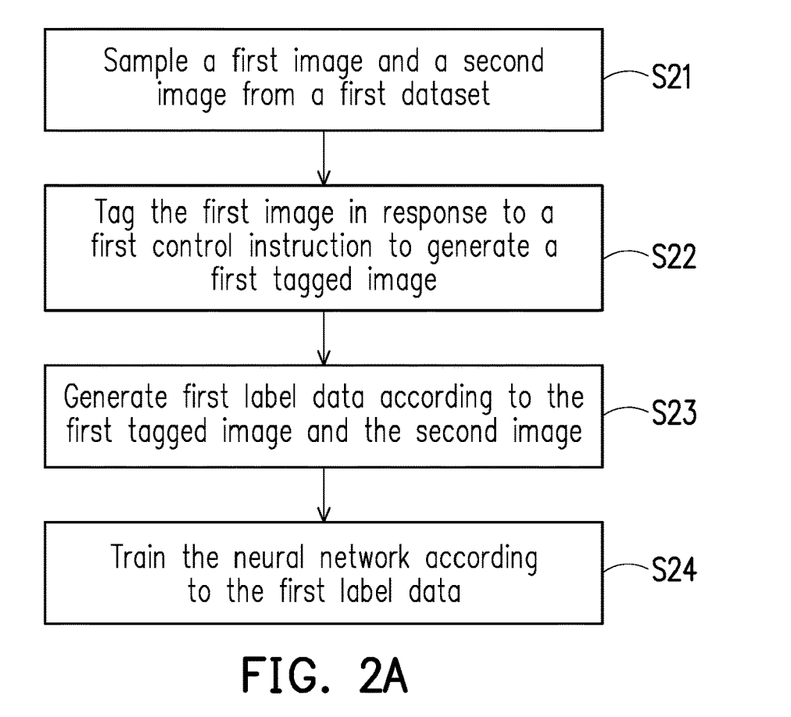
FIG. 2A is a flowchart illustrating a training method of a neural network according to an embodiment of the invention.

FIG. 2A is a flowchart illustrating a training method of a neural network according to an embodiment of the invention. The training method may be implemented by the training device 10. In the embodiment, a target object may be a display panel, but the invention is not limited thereto.

In a step S21, the sampling module 210 samples a first image and a second image from a first dataset. The first dataset includes a plurality of images respectively corresponding to one of a first object or a second object different to the first object, i.e. the first image and the second image respectively correspond to one of the first object or the second object. In the embodiment, the first image and the second image all correspond to the first object, which represents that an object in the first image and an object in the second image belong to a same type of model. On the other hand, the first image may correspond to the first object and the second image may correspond to the second object different to the first object, which represents that the object in the first image and the object in the second image belong to different types of models.

Figure 3A:
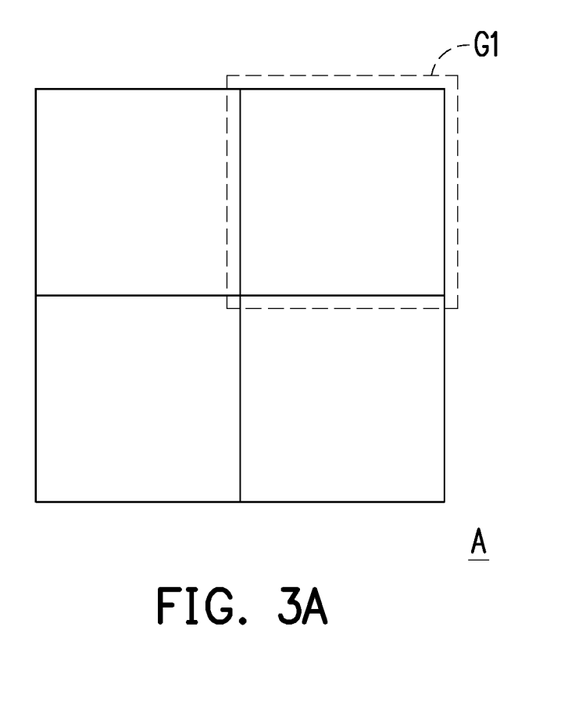
FIG. 3A and FIG. 3B are schematic diagrams of a first object and a second object according to an embodiment of the invention.
Figure 3B:
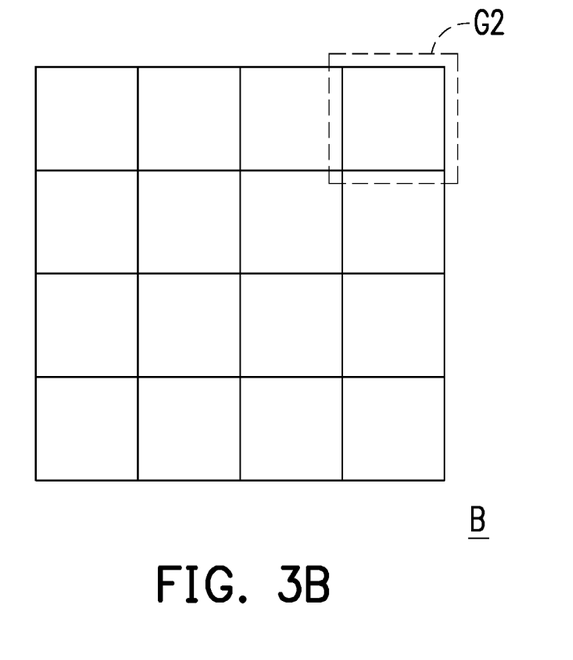

Taking FIG. 3A and FIG. 3B as an example, FIG. 3A and FIG. 3B are schematic diagrams of the first object and the second object according to an embodiment of the invention. If the first object represents a display panel of a model A, the first dataset may include a plurality of images respectively corresponding to appearances of a plurality of different display panels of the model A. The images are, for example, generated by photographing a plurality of display panels of the model A by using a camera, for example, images photographed by the camera for finished products of each of the display panels of the model A during a production process of the display panels. On the other hand, if the second object represents a display panel of a model B, the first dataset may include a plurality of images respectively corresponding to appearances of a plurality of different display panels of the model B. The images are, for example, generated by photographing a plurality of display panels of the model B by using the camera, for example, images photographed by the camera on finished products of each of the display panels of the model B during the production process of the display panels.

Moreover, the first dataset may also include display panels corresponding to different types. In an embodiment, the first dataset may also include display panels respectively corresponding to different types and different models. The types and models of the display panels are not limited by the invention. For example, the display panel may be a liquid crystal display panel or an Organic Light-Emitting Diode (OLED) panel, and the display panel may be a twisted nematic-LCD panel, or a thin film transistor-LCD panel.

In the step S21, the sampling module 210 may randomly sample the first image and the second image from a plurality of images of the first dataset. In the embodiment, the image of the display panel of the model A is the first image and the image of the display panel of the model B is the second image, and a main difference there between is that the display panel of the model A has a larger grid G1, as shown in FIG. 3A. On the other hand, the display panel of the model B has a smaller grid G2, as shown in FIG. 3B, and each grid may represent as a pixel, but the invention is not limited thereto.

In a step S22, the labelling module 220 tags the first image in response to a first control instruction to generate a first tagged image. The first control instruction is related to a user's selection of the first image and the second image. To be specific, the first control instruction may correspond to the user's selection, and the user may select the first image and the second image randomly sampled from the first dataset by the sampling module 210. In an embodiment, the user may select an image with a high defect degree from the sampled first image and the second image, and the processor 100 generates the first control instruction according to the user's selection, such that the labelling module 220 may tag the image selected by the user in response to the first control instruction to generate the first tagged image.

In a step S23, the labelling module 220 generates first label data according to the first tagged image and the second image. To be specific, the labelling module 220 may display the first image and the second image respectively corresponding to one of the first object (for example, the display panel of the model A) or the second object through a display device to the training device 10 for the user to select. The user may compare defect degrees of the appearances of the first image and the second image, and selects to tag the first image or the second image according to the defect degrees. In the embodiment, it is assumed that the user determines that the defect degree of the appearance of the first image is severer than the defect degree of the appearance of the second image, and therefore the user may select to tag the first image to generate the first tagged image. After the first tagged image is generated, the labelling module 220 may create the first label data by using the first tagged image (e.g., the first image) and the unselected image (e.g., the second image). In a step S24, the training module 230 trains the neural network according to the first label data. After the above training process, the neural network may learn to distinguish the defect degrees of the display panels of the same type A or B, or even the defect degrees of the display panels of different models. To be specific, after the first label data corresponding to the first object and the second object is produced, the training module 230 may train the neural network according to the first label data, so as to generate the neural network. Since the neural network is generated according to the label data corresponding to different objects (for example, the first object and the second object), the neural network may be adapted to different objects (for example, the first object and the second object).

Figure 2B:
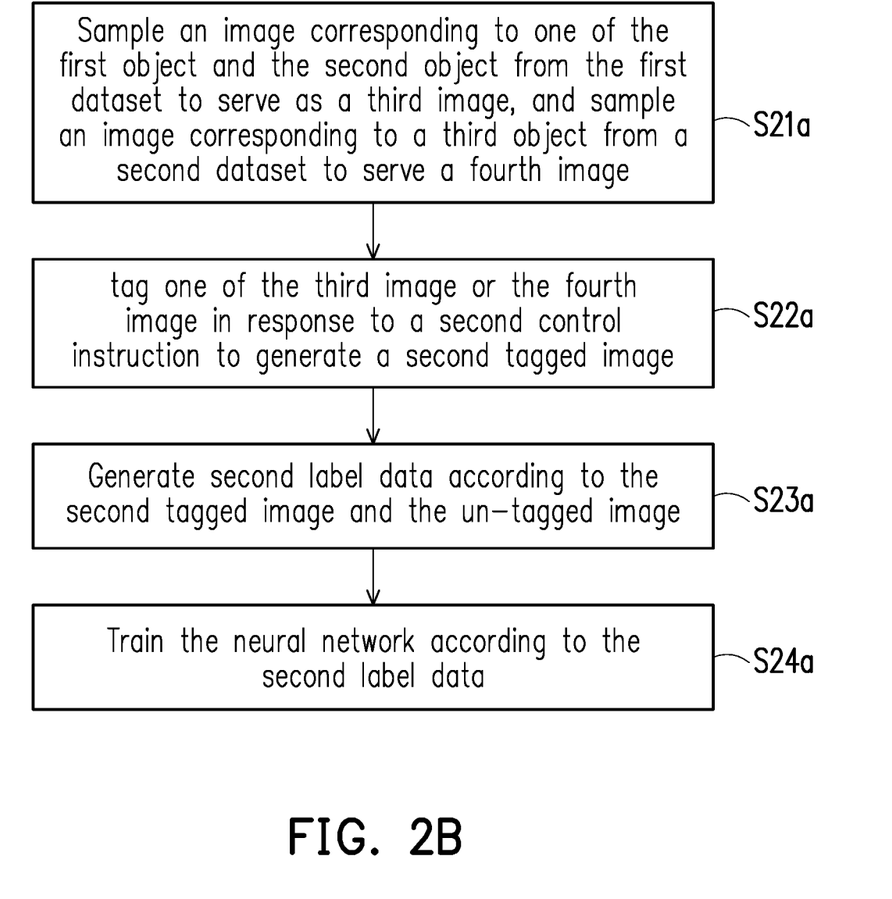
FIG. 2B is a flowchart illustrating another training method of a neural network according to an embodiment of the invention.

Referring back to FIG. 2B, FIG. 2B is a flowchart illustrating another training method of a neural network according to an embodiment of the invention. FIG. 2A and FIG. 2B have the same steps, and a main difference there between is that a third image and a fourth image may be randomly sampled from the first dataset and a second dataset to train the neural network to further recognize a defect degree of a third object. In an embodiment, the label data may correspond to the third object. The third object is different to the first object and the second object, and the third object may be a display panel of a model C.

For example, it is assumed that the first dataset used for training the neural network merely includes a plurality of images corresponding to one of the first object or the second object. When the user wants to further train the neural network that is also adapted to recognize the defect degree of the appearance of the third object, the training method of FIG. 2B is executed. In a step S21a, the sampling module 210 samples an image corresponding to one of the first object or the second object from the first dataset to serve as a third image, and samples an image corresponding to the third object from a second dataset to serve as a fourth image. The first dataset includes a plurality of images corresponding to the first object and the second object, and the second dataset includes a plurality of images corresponding to the third object. Then, in a step S22a, the labelling module 220 tags one of the third image or the fourth image in response to a second control instruction to generate a tagged image, and the other un-tagged image serves as an un-tagged image. In a step S23a, the labelling module 220 generates second label data according to the tagged image and the un-tagged image.

Finally, in a step S24a, the training module 230 trains the neural network according to the second label data. After the above training process, the second label data may include defect degree data related to the model A, the model B, and the model C, i.e. the defect degree related to the model C additionally learned by the neural network. To be specific, after the second label data corresponding to the first object, the second object and the third object is generated, the training module 230 may train the neural network according to the second label data, so as to generate the desired neural network. Since the neural network is generated according to the label data corresponding to different objects (for example, the first object, the second object, and the third object), the neural network may be adapted to different objects (for example, the first object, the second object, and the third object).

According to the above training flow, the label data of the invention includes the target objects of at least two models or types, and it is convenient to add related models or types to the original label data.

Figure 4:
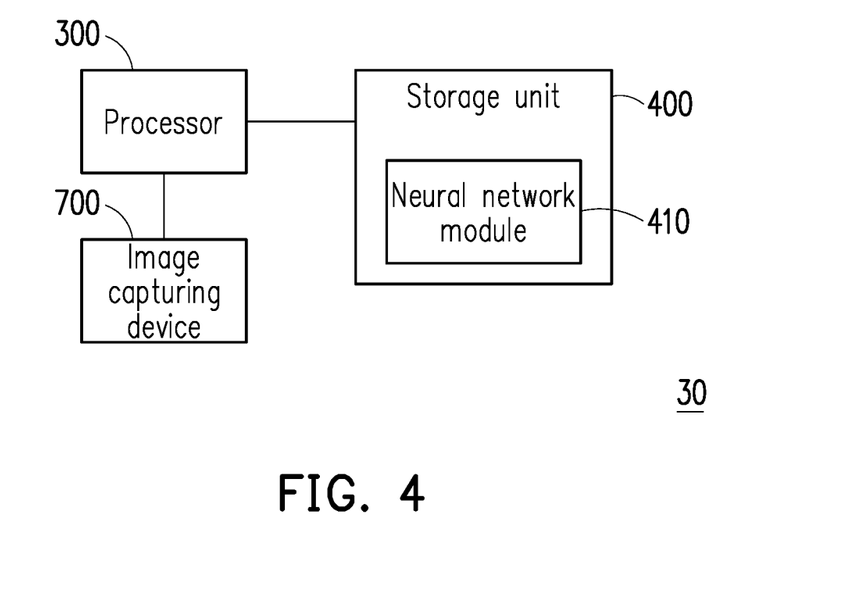
FIG. 4 is a schematic diagram of a classification device based on a neural network according to an embodiment of the invention.

FIG. 4 is a schematic diagram of a classification device 30 based on a neural network according to an embodiment of the invention. The neural network is trained by the training device 10. The classification device 30 may include a processor 300, a storage unit 400 and an image capturing device 700.

The processor 300 is, for example, a CPU, or other programmable general purpose or special purpose microprocessor, a DSP, a programmable controller, an ASIC, a GPU, or other similar device or a combination of the above devices. The processor 300 is coupled to the storage unit 400, and is adapted to access and execute various modules or various applications stored in the storage unit 400.

The storage unit 400 is, for example, any type of a fixed or movable RAM, a ROM, a flash memory, an HDD, an SSD, or a similar device or a combination of the above devices, and is configured to record a plurality of modules or various applications that may be executed by the processor 300. In the embodiment, the storage unit 400 may store a neural network module 410, and the neural network module 410 corresponding to the neural network trained by the training device 10.

The image capturing unit 700 may be any type of a camera device or a video camera device, and is not limited to an image capturing function of visible light, for example, in a special manufacturing process, light of a specific wavelength may be used for photographing. In the embodiment, the image capturing unit 700 may execute an image capturing operation to provide a target image to the processor 300.

Figure 5:
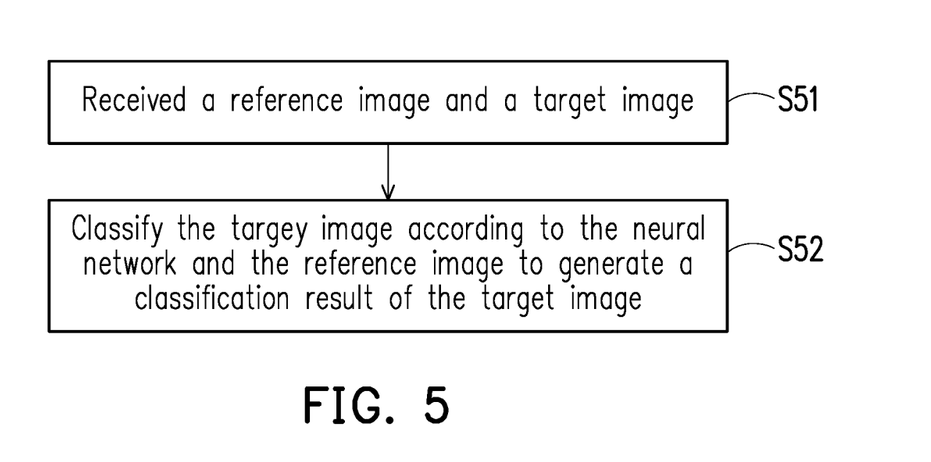
FIG. 5 is a flowchart illustrating a classification method based on a neural network according to an embodiment of the invention.

FIG. 5 is a flowchart illustrating a classification method based on a neural network according to an embodiment of the invention, and the classification method may be implemented by the classification device 30.

Referring to FIG. 4 and FIG. 5, in a step S51, through the processor 300, the neural network module 410 receives a reference image and a target image. In a step S52, the neural network module 410 classifies the target image according to the neural network and the reference image, so as to generate a classification result of the target image. The reference image may correspond to the first object, and the target image may correspond to the second object different to the first object, and the classification result of the target image is used for indicating whether an object in the target image has an appearance defect, and the classification result is related to a difference between defect degrees of the reference image and the target image.

For example, if the user of the classification device 30 wants to check whether a product associated with the first object (for example, the display panel of the model A) has an appearance defect, the user may obtain an image of the appearance of the product through a device such as a video camera, etc., to serve as the target image, and select one of a plurality of images respectively associated with the first object and the second object to serve as a reference image. The reference image may serve as criteria for determining whether the target image has the appearance defect. When the defect degree of the appearance of the target image is severer than the defect degree of the appearance of the reference image, the classification device 30 may classify the product corresponding to the target image as a defective product. In other words, the user may adjust the criteria used for determining whether the target image has the appearance defect by replacing the reference image. For example, the user may replace the reference image to adjust a miss rate or a False Negative Rate (FNR) or a False Positive Rate (FPR) of the neural network used by the neural network module 410. Examples of the reference image are shown in FIG. 6A and FIG. 6B, which are described in detail below.

Figure 6A:
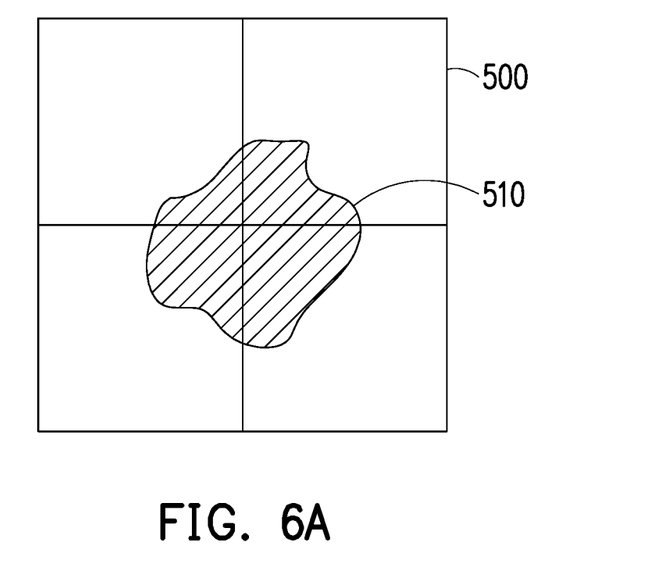
FIG. 6A and FIG. 6B are schematic diagrams of reference images with different defect degrees according to an embodiment of the invention.
Figure 6B:
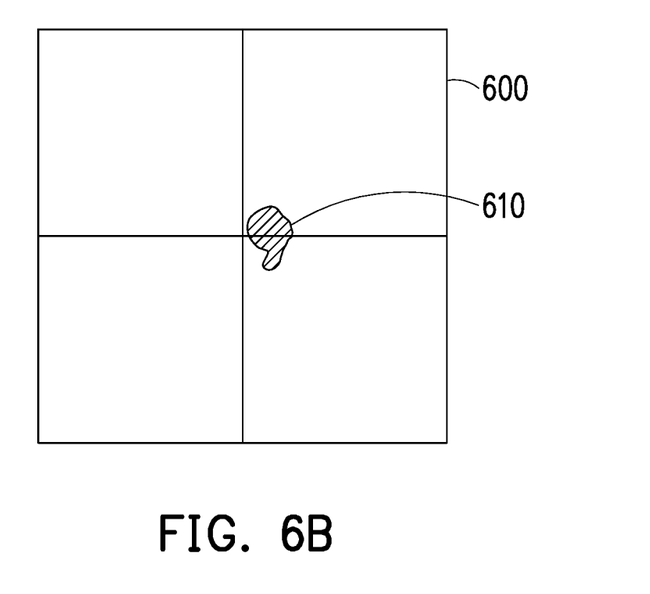

FIG. 6A and FIG. 6B are schematic diagrams of a reference image 500 and a reference image 600 with different defect degrees according to an embodiment of the invention. In the embodiment, it is assumed that the reference image 500 and the reference image 600 correspond to the first object (for example, the display panel of the model A). Referring to FIG. 6A and FIG. 6B, the reference image 500 has a severe appearance defect 510, and the reference image 600 has a minor appearance defect 610.

When the classification device 30 classifies the target image corresponding to the first object (for example, the display panel of the model A), if the reference image 500 is selected as the reference image used by the neural network module 410, the neural network module 410 may classify the object in the target image as a defective product when the appearance defect of the target image is severer than the appearance defect 510. Since the appearance defect 510 belong to a significant defect, the objects in the target images with minor appearance defects are classified to normal products, so that a miss rate of the classification device 30 is increased. By contrast, the user may change to use the reference image 600 as the reference image used by the neural network module 410. Since the appearance defect 610 belong to a very tiny defect, the objects in the target images with minor appearance defects are classified to the defective products, so that the miss rate of the classification device 30 is decreased. Correspondingly, a false positive rate of the classification device 30 may increase accordingly.

In brief, the user may adjust the miss rate and the false positive rate of the classification result of the neural network module 410 by adjusting the reference image of different defect degree.

It should be tagged that in some embodiments, the aforementioned target image, the reference image 500 and the reference image 600 may respectively correspond to the same or different models or types, which is not limited by the invention.

In summary, the invention provides a supervised training method of a neural network, and the user may tag one of the two images to generate the label data according to the two images. When the neural network is trained, the input parameter may include the label data respectively corresponding to different objects. In this way, the trained neural network may be adapted to objects of different types or models. When the neural network is used for classifying, the user may intuitively adjust the objects for the neural network or the classification criteria of the neural network by means of changing the reference image.

For example, when the target object is a display panel of the model A, the user of the classification device may input a reference image corresponding to the display panel of the model A to the neural network to serve as the classification criteria of the neural network. When the target object is changed to a display panel of the model B, the user only need to change the reference image to a reference image corresponding to the display panel of the model B, and the neural network can be used continuously.

For another example, when the user regards that the miss rate of the neural network is too high (i.e. a determination criteria of the neural network on the appearance defect is too stringent, which results in a fact that many defective products are not screened), the user may change the reference image used for determining the appearance defect to a reference image having a minor appearance defect, such that the determination criteria of the neural network on the appearance defect becomes looser.

The supervised training device and method for training a neural network, and the supervised classification method and device based on the neural network are provided. The neural network of the invention is adapted to different situations without retraining, and meanwhile it maintains the advantages of high accuracy and high precision of the neural network based on supervised learning.

It will be apparent to those skilled in the art that various modifications and variations can be made to the disclosed embodiments without departing from the scope or spirit of the invention. In view of the foregoing, it is intended that the invention covers modifications and variations provided they fall within the scope of the following claims and their equivalents. Moreover, any embodiment of or the claims of the invention is unnecessary to implement all advantages or features disclosed by the invention. Moreover, the abstract and the name of the invention are only used to assist patent searching. Moreover, "first", "second", etc. mentioned in the specification and the claims are merely used to name the elements and should not be regarded as limiting the upper or lower bound of the number of the components/devices.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A supervised classification device based on a trained neural network, comprising:
   a storage medium, storing the trained neural network;
   an image capturing device, configured to generate a target image including an appearance of an object; and
   a processor, coupled to the storage medium and the image capturing device, and configured to:
   receive a reference image and the target image, and classify the target image according to the trained neural network and the reference image, so as to generate a classification result of the target image, wherein a first image and a second image are sampled from a first dataset, a first control instruction is generated after an image with a higher defect degree from the first image and the second image is selected by the user, the image with the higher defect degree from the first image and the second image is tagged in response to the first control instruction to generate a first tagged image, wherein label data is generated according to the first tagged image and an unselected image from the first image and the second image, and the trained neural network is formed according to the label data, wherein the classification result of the target image indicates whether the object in the target image has an appearance defect and is related to a difference of defect degrees of the reference image and the target image, wherein a classification criteria of the trained neural network used to determine whether the object in the target image has the appearance defect is adjusted by changing the reference image inputted to the trained neural network.

2. The supervised classification device based on the trained neural network as claimed in claim 1, wherein the first dataset corresponds to a first object and a second object different to the first object, the reference image corresponds to one of the first object or the second object, and the target image corresponds to one of the first object or the second object.

3. The supervised classification device based on the trained neural network as claimed in claim 2, wherein the processor is configured to:
   sampling a third image from the first dataset, wherein the third image corresponds to one of the first object or the second object;
   sampling a fourth image from a second dataset, wherein the fourth image corresponds to a third object;
   tagging one of the third image or the fourth image in response to a second control instruction to generate a second tagged image, and taking the other image that is not tagged as an un-tagged image;
   generating second label data according to the second tagged image and the un-tagged image; and
   forming the trained neural network according to the second label data.

4. The supervised classification device based on the trained neural network as claimed in claim 3, wherein
   the second dataset corresponds to a third object different to the first object and the second object, the third image corresponds to one of the first object or the second object, and the fourth image corresponds to the third object.

5. The supervised classification device based on the trained neural network as claimed in claim 1, wherein the reference image adjusts at least one of a miss rate and a false positive rate of the trained neural network.

6. A supervised classification method based on a trained neural network, comprising:
   sampling a first image and a second image from a first dataset;
   generating a first control instruction after an image with a higher defect degree from the first image and the second image is selected by a user;
   tagging the image with the higher defect degree from the first image and the second image in response to the first control instruction to generate a first tagged image;
   generating label data according to the first tagged data and an unselected image from the first image and the second image;
   forming a trained neural network according to the label data;
   receiving a reference image and a target image including an appearance of an object; and
   classifying the target image according to the trained neural network and the reference image, so as to generate a classification result of the target image, wherein the classification result of the target image indicates whether the object in the target image has an appearance defect and is related to a difference of defect degrees of the reference image and the target image, wherein a classification criteria of the trained neural network used to determine whether the object in the target image has the appearance defect is adjusted by changing the reference image inputted to the trained neural network.

7. The supervised classification method based on the trained neural network as claimed in claim 6, wherein the first dataset corresponds to a first object and a second object different to the first object, the reference image corresponds to one of the first object or the second object, and the target image corresponds to one of the first object or the second object.

8. The supervised classification method based on the trained neural network as claimed in claim 7, wherein the step of forming the trained neural network comprises:
   sampling a third image from the first dataset, wherein the third image corresponds to one of the first object or the second object;
   sampling a fourth image from a second dataset, wherein the fourth image corresponds to a third object;
   tagging one of the third image or the fourth image in response to a second control instruction to generate a second tagged image, and taking the other image that is not tagged as an un-tagged image;

generating second label data according to the second tagged image and the un-tagged image; and forming the trained neural network according to the second label data.

9. The supervised classification method based on the trained neural network as claimed in claim 8, wherein the second dataset corresponds to a third object different to the first object and the second object, the third image corresponds to one of the first object or the second object, and the fourth image corresponds to the third object.

10. The supervised classification method based on the trained neural network as claimed in claim 6, wherein the reference image adjusts at least one of a miss rate and a false positive rate of the trained neural network.

* * * * *